Figures 1, 2:
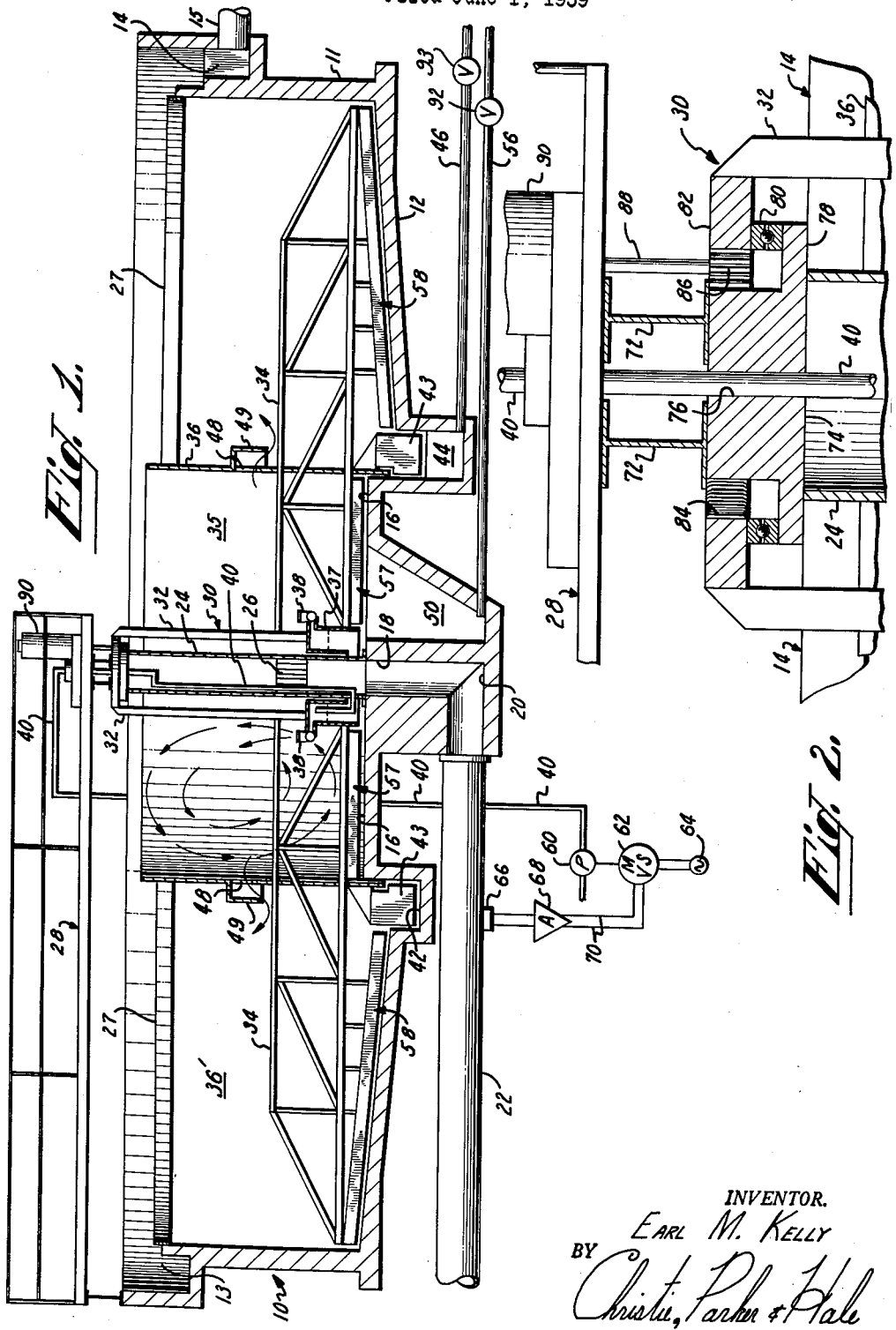

Feb. 19, 1963

E. M. KELLY 3,077,991

CLARIFICATION

Filed June 1, 1959

INVENTOR.
EARL M. KELLY
BY
Christie, Parker & Hale
ATTORNEYS

United States Patent Office 3,077,991
Patented Feb. 19, 1963

3,077,991
CLARIFICATION
Earl M. Kelly, Hillsborough, Calif., assignor to Process
Engineers, Inc., San Mateo, Calif., a corporation of
Nevada
Filed June 1, 1959, Ser. No. 817,280
5 Claims. (Cl. 210—523)

This invention relates to clarification, and more particularly to the separation of settleable solids from a liquid in which the solids are suspended. The invention is useful in many processes involving the separation of solids from liquids by settlement, but is particularly adapted for sewage treatment, and is described with specific reference to that field.

In the treatment of sewage and trade waste liquids for clarification, it is often necessary to remove grit, which is largely inorganic and relatively fast settling, as well as to remove smaller particles of sludge which are primarily organic and settle more slowly. A majority of the sewage treatment plants in use today have a separate grit removal tank ahead of clarification apparatus in which the organic solids are settled. In the clarification apparatus, the degritted liquid is usually aerated to supply the biochemical oxygen demand (BOD) of the sewage and to aid in flocculation of colloidal and gelatinous organic suspended matter. U.S. Patent 2,649,412 describes and claims combined aeration and clarification apparatus which has met with outstanding success in treating sewage. However, one disadvantage of the prior are apparatus used in treating sewage and the like, is that separate degritting apparatus is required, with attendant increase in initial cost and increased operation and maintenance costs.

This invention provides a single unit or tank which performs the triple function of grit removal, aeration, and clarification or sedimentation of sludge or organic particles, with a resulting decrease in initial cost and operating and maintenance expense. In the apparatus of this invention, grit removal and aeration are achieved in the same compartment where the aeration of the liquid serves the multiple function of scrubbing organic material from the grit, reducing the BOD of the liquid, aiding in promoting the flocculation of the organic solids, freshening the sewage, and reducing scum formation.

In the conventional prior art grit removers, where grit is removed in a separate compartment, some organic material is carried down with the grit, which must be promptly removed by further treatment to avoid production of a highly odorous grit, which is difficult to dispose of without nuisance. The apparatus of this invention produces a grit which is relatively clean and free of putrescible matter.

Briefly, the invention contemplates apparatus for separately removing solids of one settling rate and solids of a lower settling rate from a liquid in which the solids are suspended. The apparatus includes a tank with a baffle disposed in the tank to form an aeration compartment on one side of the baffle and a sedimentation or clarification compartment on the other side of the baffle. The two compartments are in communication with each other so that liquid can flow from the aeration compartment into the clarification compartment. Means are provided for introducing the liquid and suspended solids into the aeration compartment, and means are provided for aerating the liquid in the aeration compartment. A grit pocket is located in a lower portion of the aeration compartment, and means are provided in the aeration compartment for moving settled solids of the said one settling rate toward the grit pocket. A sludge pocket is located in a lower portion of the clarification compartment, and means are provided in the clarification compartment for moving settled solids of the lower settling rate toward the sludge pocket. Means are also provided for removing clarified effluent from an upper portion of the clarification compartment.

In the preferred form of the invention, means are provided for introducing a variable amount of air into the liquid in the aeration compartment so that the agitation of the liquid in the aeration compartment can be controlled to obtain the desired degree of grit removal, and also to compensate for variations of flow rate of the influent. Preferably, the aeration rate is made to be automatically inversely proportional to the rate of influent flow, so that as the flow rate of influent is relatively high, the air rate is decreased to reduce the tendency for grit to be carried over with the solids which settle more slowly. Conversely, when the influent rate is relatively low, the air rate is increased to prevent the solids which settle more slowly from settling in the aeration compartment with the grit.

These and other aspects of the invention will be more fully understood from the following description taken in conjunction with the accompanying drawing in which:

FIG. 1 is sectional elevation of the presently preferred form of the invention; and FIG. 2 is an enlarged view of the rotating mechanism of the apparatus of FIG. 1.

Referring to FIG. 1, the apparatus includes a cylindrical tank 10 having an upright wall 11 and a bottom wall 12, the outer annular portion of which slopes gently inwardly and downwardly. The tank may be made of any suitable material, but conveniently is of concrete, and includes an annular launder 13 formed integrally around the upper edge of the wall. The launder opens into a sump 14 from which clarified effluent is removed from the tank by an effluent pipe 15.

A circular, flat, central portion 16 of the tank bottom is raised slightly above the remainder of the bottom and includes in its center a vertical bore 18 which opens at its upper end into the tank and at its lower end into a horizontal bore 20 which is connected to an influent pipe 22 through which influent liquid with suspended solids flows into the tank. An upwardly extending inlet conduit 24 is secured at its lower end to the tank bottom around bore 18, and terminates at its upper end at the same level as the upper edge of the launder 13. A plurality of vertical louvers 26 are provided in the inlet conduit just above its lower end to admit influent to the central portion of the tank. A conventional horizontal walkaway 28 has an outer end disposed on the upper edge of the launder, and the other end resting on the upper end of the inlet conduit as shown in detail in FIG. 2. The operating level of liquid in the tank is established by an annular wier 27 attached to the inside of the upper edge of the tank wall.

An elongated rotatable cage 30 is disposed coaxially around the inlet conduit and supported on the upper end of the inlet conduit as described in detail below with respect to FIG. 2. The cage includes a plurality of vertical braces 32 to which are attached the inner ends of a pair of diametrically opposed and outwardly extending arms 34 that are disposed just above the tank bottom and terminate near the wall of the tank. An annular baffle 36 is coaxially disposed around the cage and inlet conduit and is mounted on the horizontal arms to rotate with them and the cage. The baffle divides the tank into an inner circular aeration and degritting compartment 35 and an outer annular clarification or sedimentation compartment 36'. A downwardly opening annular air distributor 37 is attached to the lower end of the cage braces and to the inner portion of the horizontal arms. A plurality of upwardly opening air diffusers 38 are connected to the upper part of the air distributor. The air diffusers may be of conventional type or of the non-plugging type such as disclosed in my copending application Serial No. 606,501, filed August 27, 1956, and now abandoned. An air supply line 40 extends down the interior of the inlet conduit, out the lower portion of the inlet conduit and opens into the air distributor.

The lower edge of the baffle makes a close fit around the central portion of the tank bottom and extends down into an annular sludge trough 42 disposed between the annular sloping portion of the tank bottom and the central flat portion of the tank bottom. A pair of diametrically opposed upright sludge scrapers 43 are attached to the lower edge and disposed in the annular sludge trough and scrape sludge into a sludge pocket 44 located below the annular sludge trough. A sludge outlet pipe 46 is connected to the sludge pocket for the removal of sludge from the tank.

A pair of diametrically opposed ports 48 in the intermediate portion of the baffle provide communication between the aeration compartment and the surrounding annular clarification compartment. Each port 48 has a downwardly opening hood or skirt 49 over it so that the liquid flowing outwardly is forced to flow down and then up as indicated by the arrows in FIG. 1. This flow pattern has the effect of aiding the force of gravity and separating solids from the liquid entering the clarification compartment. A grit pocket 50 is located in the central portion of the tank bottom below the aeration compartment. A grit discharge line 56 is connected to grit pocket for the removal of grit from the tank.

A first set of raking blades 57 are attached to the inner portion of the horizontal arms and are set at an angle to rake grit inwardly along the central flat portion of the tank bottom to the grit discharge pocket. A second set of raking blades 58 are attached to the outer portion of the arms outside the annular baffle and are set to rake settled sludge inwardly along the annular portion of the tank bottom into the annular sludge trough, where the sludge is moved by the sludge scrapers 43 into the sludge pocket.

The air line 40 is connected to an air pump or blower 60, which in turn is driven by a variable speed motor 62 supplied electrical power from a source 64. The speed of the motor is controlled in accordance with the influent rate by a pressure pickup 66, which may be of the strain gauge type. The output of the pickup is fed into an amplifier 68, having an output connected by leads 70 to the field windings (not shown) of the variable speed motor. The variable speed motor 62 is a D.C. shunt type, in which the speed of the motor increases as the field flux is decreased, and the speed decreases when the field flux is increased. Thus, as the rate of influent flow increases, the pressure pickup 66 senses the increased pressure and produces an increased output, which is amplied and transmitted to the field windings of the variable speed motor, causing the field flux to increase and the motor speed to decrease. Conversely, as the pressure in the influent column decreases, the field flux in the motor also decreases and motor speed increases. The effect of this operation, as is described in detail below, is to prevent grit being carried over with the sludge solids during periods of high influent flow, and to reduce the tendency for sludge and other organic material to settle with the grit in the grit pocket during periods of relatively low influent flow.

Referring to FIG. 2, the inner end of the walkway rests on a pair of laterally spaced I beams 72 disposed on the upper surface of a circular bearing plate 74 mounted on the upper end of the inlet conduit. The bearing plate includes a central opening 76 through which the air supply line 40 extends, and an outwardly extending annular flange 78 on which an annular thrust bearing 80 is disposed. A ring gear 82 rests on the thrust bearing and has a plurality of internal teeth 84 which mesh with a pinion drive gear 86 connected to the lower end of a drive shaft 88 of a motor 90 supplied power from a suitable source (not shown). The upper ends of the cage braces 32 are connected to the periphery of the ring gear so that as it is turned by the motor 90, the cage, horizontal arms, rakes, and air distributor are rotated together.

The operation of the apparatus of FIGS. 1 and 2 is as follows:

Liquid influent, say sewage, with suspended grit and organic matter flows in the influent pipe and is discharged into the aeration compartment through the vertical louvers 26 in the inlet conduit 24. The liquid flows in at such a rate that an operating level is established to be at the upper edge of the wier. Air is pumped in the air supply line by the operation of pump 60 so that there is sufficient air pressure supplied to the air distributor to force the liquid level in the air distributor down to the dotted line position shown in FIG. 1, and force air out the air diffusers at such a rate that the liquid in the aeration compartment is subjected to an up and down circulation as indicated by the arrows on FIG. 1. Flocculation and subsequent settlement of the organic solids in the sewage is facilitated by the aeration and circulation action induced by the air diffusers. In addition, the air maintains an aerobic condition in the sewage, and helps satisfy its biochemical oxygen demand. The air also cleans and scrubs organic matter from the grit so that clean grit settles to the bottom of the tank within the aeration compartment where it is raked by the blades 56 to the grit pocket. A valve 92 or a grit pump (not shown) in the grit discharge line controls the rate of grit removal from the pocket. The aeration also discourages scum formation.

The bulk of the organic solids or sludge remains suspended in the liquid in the aeration compartment and flow to the outer annular sedimentation or clarification compartment, which is relatively quiescent. The bulk of the sludge settlement occurs here, and solids, as they settle, are raked inwardly by the rakes 58 and scrapers 43 into the sludge trough and pocket, from which they are removed through the sludge pipe 46. The rate of sludge removal is controlled by a valve 93 or a sludge pump (not shown) in the sludge pipe. Clarified liquid effluent overflows the top of the wier into the peripheral launder 14 and is carried away through the effluent discharge pipe.

The ratio of the horizontal cross-sectional area of the aeration and degritting compartment to the clarification compartment is not entirely critical, and can be adjusted to achieve the desired mesh of grit removal and the amount of aeration desirable for the liquid being treated. In the arrangement shown in the drawing, the diameter of the aeration compartment is 30% of the overall tank diameter, which provides a cross-sectional area of the aeration and degritting compartment of about 9% of the overall tank area. For a typical average flow through the unit on the basis of 900 gallons per square foot per day on the gross tank area, and with a maximum flow of 1.5 times this average flow, the area of the central compartment is sufficient to allow removal of approximately 95% of all +150 mesh grit particles, if no air is circulated in the aeration compartment.

Ordinarily, a removal of 95% of all 65 mesh grit is considered satisfactory for an average grit removal unit, although it is sometimes desirable to remove more of the smaller particles. Some operations require the removal of 95% of all 100 mesh, and for this reason it is preferable that the central aeration and degritting compartment be capable for removing up to 95% of all 150 mesh material, with maximum flow and no air circulation. Through the use of aeration, the mesh size of grit removed is controllable, and it is possible to obtain anything from 95% of the 150 mesh particles down to 95% of the particles coarser than 65 mesh by simply decreasing or increasing the amount of air added to the aeration compartment. With the circulation of air in the amount of about 0.25 c.f.m. per square foot of aeration compartment, and a throughput of about 12,000 gal./sq.ft./24 hours, based on the area of the aeration compartment and maximum flow, the apparatus removes 95% of the grit in the mesh range between 65 and 100, and this grit is exceptionally clean due to the air scrubbing action.

Ordinarily, when the unit shown in the drawing is used for primary treatment of sewage and industrial wastes, a scum skimmer (not shown) is used in the outer compartment to scrape scum from the liquid surface into a scum box (not shown). However, both the scum scraper and the scum box may be of conventional design, and since they form no part of this invention are not illustrated.

The aeration on the degritting compartment is important because without the use of the air, there would be a large amount of sludge drop out with the grit during relatively low flow rates of influent, and it would be very difficult to obtain a clean grit. The variable air capacity of the apparatus shown in FIGS. 1 and 2 makes it possible for the mesh of the grit removed to be controlled almost independently of flow rate through the unit. This result is achieved because the pressure pickup senses the rate of influent flow into the unit and adjusts the speed of the air pump motor accordingly so that the rate of agitation and aeration in the degritting compartment is decreased as influent flow rate increases, and is increased as the influent flow rate decreases. Of course, the variation in air injection can be controlled by other suitable automatic means, or even manually.

Although the invention has been described in detail with respect to a single tank of circular cross-section because this is the preferred embodiment, it may also be applied to rectangular tanks.

Likewise, although the point of influent entry into the aeration compartment is shown in the lower portion of the inlet conduit 24, because that is the preferred location, the flow could enter the aeration compartment at any point above tank bottom.

It will also be obvious that the baffle for the apparatus need not be rotatable as shown in FIGS. 1 and 2, but can be stationary. Moreover, the baffle need not extend down below the bottom of the tank, but can terminate above it as in U.S. Patent 2,649,412. In such a case the ports 48 could be omitted.

The annular sludge trough and discharge hopper can be located either adjacent the baffle dividing the two compartments as shown in FIG. 1, or the trough can be at any location from this point out to the periphery of the tank. However, the arrangement shown in FIG. 1 is preferred because it permits attaching the sludge trough scrapers 43 to the rotatable baffle, thereby permitting a greater number of trough rakes to deliver sludge to the sludge pocket more quickly than if the sludge pocket were located at the tank periphery.

I claim:

1. Apparatus for treating a liquid sewage stream to remove separately relatively fast settling grit and more slowly settling organic solids suspended therein, the apparatus comprising a tank, a baffle in the tank and extending to the bottom of the tank to form an aeration compartment on one side of the baffle and a sedimentation compartment on the other side of the baffle, means for introducing the liquid and suspended solids into the aeration compartment, means for adding air to the liquid in the aeration compartment at a rate to scrub organic matter from the grit, keep the slower settling organic solids suspended in liquid in the aeration compartment and to permit faster settling grit to settle in the aeration compartment, a grit pocket in a lower portion of the aeration compartment and below the means for adding air, means for moving settled grit into the grit pocket, means for removing settled grit from the grit pocket to a point remote from the apparatus, the baffle having at least one opening at an elevation above that of the means for adding air to the aeration compartment and providing hydraulic communication between the aeration compartment and the sedimentation compartment for moving liquid and suspended organic solids from the aeration compartment to the sedimentation compartment independently of the removal of the faster settling grit from the aeration compartment, a sludge pocket in the lower portion of the sedimentation compartment, means for moving settled organic solids into the sludge pocket, means for removing clarified effluent from the sedimentation compartment at a point above the baffle opening, and means for separately removing settled organic solids from the sludge pocket directly to a point remote from the apparatus and independently of the removal of settled grit from the grit pocket.

2. Apparatus according to claim 1 in which the baffle extends above the means for removing clarified effluent from the sedimentation compartment.

3. Apparatus according to claim 1 which includes means for raking settled grit along the bottom of the aeration compartment away from the sludge pocket and into the grit pocket.

4. Apparatus according to claim 1 in which the baffle encloses the aeration compartment in the central portion of the tank so the aeration compartment is entirely surrounded by the sedimentation compartment.

5. Apparatus according to claim 4 in which the tank and aeration compartment are circular, and the aeration compartment is concentrically disposed within the tank.

References Cited in the file of this patent

UNITED STATES PATENTS

| | | |
|---|---|---|
| 2,649,412 | Kivari et al. | Aug. 18, 1953 |
| 2,678,912 | Kalinske et al. | May 18, 1954 |
| 2,678,916 | Kalinske | May 18, 1954 |
| 2,713,027 | Binford | July 12, 1955 |
| 2,813,074 | Banks et al. | Nov. 12, 1957 |
| 2,825,691 | Fischer | Mar. 4, 1958 |
| 2,987,185 | Feeney | June 6, 1961 |

FOREIGN PATENTS

| | | |
|---|---|---|
| 457,618 | Canada | June 28, 1949 |